US011429660B2

(12) United States Patent
Liang

(10) Patent No.: US 11,429,660 B2
(45) Date of Patent: Aug. 30, 2022

(54) PHOTO PROCESSING METHOD, DEVICE AND COMPUTER EQUIPMENT

(71) Applicant: GUANGDONG OPPO MOBILE TELECOMMUNICATIONS CORP., LTD., Guangdong (CN)

(72) Inventor: Kun Liang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 218 days.

(21) Appl. No.: 16/605,468

(22) PCT Filed: Apr. 19, 2017

(86) PCT No.: PCT/CN2017/081100
§ 371 (c)(1),
(2) Date: Oct. 15, 2019

(87) PCT Pub. No.: WO2018/191889
PCT Pub. Date: Oct. 25, 2018

(65) Prior Publication Data
US 2020/0372068 A1 Nov. 26, 2020

(51) Int. Cl.
G06F 16/583 (2019.01)
G06F 16/16 (2019.01)
G06F 16/13 (2019.01)
G06F 16/51 (2019.01)
G06K 9/62 (2022.01)

(52) U.S. Cl.
CPC ............ G06F 16/51 (2019.01); G06F 16/137 (2019.01); G06F 16/162 (2019.01); G06F 16/5854 (2019.01); G06K 9/6201 (2013.01)

(58) Field of Classification Search
CPC .... G06F 16/51; G06F 16/5854; G06F 16/162; G06F 16/137; G06F 16/583; G06F 16/00; G06K 9/6201
See application file for complete search history.

(56) References Cited

U.S. PATENT DOCUMENTS 7,412,449 B2*  8/2008  Both ................. G06F 16/137
2010/0318501 A1* 12/2010  Alaimo ............... G06F 21/52
707/694

(Continued)

FOREIGN PATENT DOCUMENTS

CN  102265598   11/2011
CN  104111778   10/2014

(Continued)

OTHER PUBLICATIONS

Bosselut et al., "Learning Prototypical Event Structure from Photo Albums," Proceedings of the 54th Annual Meeting of the Association for Computational Linguistics, vol. 1: Long Papers, Jan. 2016, pp. 1769-1779.

(Continued)

Primary Examiner — Hosain T Alam
Assistant Examiner — Chongsuh Park
(74) Attorney, Agent, or Firm — Hodgson Russ LLP

(57) ABSTRACT

The disclosure discloses a photo processing method including: acquiring characteristic information of each of a plurality of photos in an album; determining, based on the characteristic information, a matching degree between every two adjacent photos of the plurality of photos with predetermined storage orders; and generating at least one aggregation folder, when the plurality of photos in the album comprises photos whose storage orders are successive and matching degree is greater than or equal to a preset threshold, wherein each of the at least one aggregation folder is configured to aggregate the photos whose storage orders are successive and matching degree is greater than or equal to the preset threshold.

17 Claims, 11 Drawing Sheets

(56) References Cited

U.S. PATENT DOCUMENTS

| | | | | |
|---|---|---|---|---|
| 2014/0355865 A1* | 12/2014 | Cantley | ............... | G06Q 20/042 382/137 |
| 2015/0142742 A1* | 5/2015 | Hong | ................... | G06F 16/137 707/634 |
| 2017/0053125 A1* | 2/2017 | Savagaonkar | ......... | G06F 21/60 |

FOREIGN PATENT DOCUMENTS

| CN | 104133917 | 11/2014 |
|---|---|---|
| CN | 106155924 | 11/2016 |
| WO | 2016173350 | 11/2016 |

OTHER PUBLICATIONS

Lu et al., "Digital Photo Similarity Analysis in Frequency Domain and Photo Album Compression," Proceedings of the 3rd International Conference on Mobile and Ubiquitous Multimedia, Oct. 2004, pp. 237-244.

EPO, Office Action for EP Application No. 17906536.2, dated Jan. 10, 2020.

European Patent Office, Examination Report for EP Application No. 17906536.2, dated Feb. 25, 2021.

Tang et al., "Structural Feature-Based Image Hashing and Similarity Metric for Tampering Detection", Fundamenta Informaticae, vol. 106, No. 1, Jan. 1, 2011.

WIPO, ISR for PCT/CN2017/081100, Jan. 8, 2018.

IPI, Office Action for IN Application No. 201917042644, dated Jun. 4, 2021.

"What is image hashing used for?", Stack Overflow, retrieved from the Internet: <https://stackoverflow.com/questions/998662/what-is-image-hashing-used-for>, 2022.

"List of hash functions," Wikipedia, the free encyclopedia, retrieved from the Internet: <https://web.archive.org/web/20150226081607/https://en.wikipedia.org/wiki/List of hash functions>, 2022.

EPO, Oral proceedings for EP Application No. 17906536.2, dated Jun. 13, 2022.

* cited by examiner

PHOTO PROCESSING METHOD, DEVICE AND COMPUTER EQUIPMENT

CROSS-REFERENCE TO RELATED APPLICATION

This application is a U.S. national phase application of International Application No. PCT/CN2017/081100, filed Apr. 19, 2017, the entire disclosure of which is incorporated herein by reference.

TECHNICAL FIELD

The present disclosure relates to photo processing field, more particularly, relates to a photo processing method, device and a computer equipment.

BACKGROUND

Many portable devices, such as smartphones, are provided with photo capture functionality. The portable device album often stores a large quantity of photos. Users will spend much time on seeking a specific photo by scanning the photos one by one, leading to a low efficient in finding photos.

SUMMARY

The embodiment of the present disclosure provides a photo processing method, device and a computer equipment, which can improve the efficiency of finding photos.

In some embodiment, a photo processing method includes:

acquiring characteristic information of each of a plurality of photos in an album;

determining, based on the characteristic information, a matching degree between every two adjacent photos of the plurality of photos with predetermined storage orders; and generating at least one aggregation folder, when the plurality of photos in the album comprises photos whose storage orders are successive and matching degree is greater than or equal to a preset threshold, wherein each of the at least one aggregation folder is configured to aggregate the photos whose storage orders are successive and matching degree is greater than or equal to the preset threshold.

In some embodiment of the present disclosure, a photo processing device include:

an acquiring module configured to acquiring characteristic information of each of a plurality of photos in an album;

a determining module configured to determine, based on the characteristic information, a matching degree between every two adjacent photos of the plurality of photos with predetermined storage orders; and a generating module configured to generate at least one aggregation folder, when the plurality of photos in the album comprises photos whose storage orders are successive and matching degree is greater than or equal to a preset threshold, wherein each of the at least one aggregation folder is configured to aggregate the photos whose storage orders are successive and matching degree is greater than or equal to the preset threshold.

In some embodiment of the present disclosure, a computer equipment includes a memory, a processer, and a computer program stored in the memory and executable by the processor, when executing the computer program the processor implementing the steps of:

acquiring characteristic information of each of a plurality of photos in an album;

determining, based on the characteristic information, a matching degree between every two adjacent photos of the plurality of photos with predetermined storage orders; and generating at least one aggregation folder, when the plurality of photos in the album comprises photos whose storage orders are successive and matching degree is greater than or equal to a preset threshold, wherein each of the at least one aggregation folder is configured to aggregate the photos whose storage orders are successive and matching degree is greater than or equal to the preset threshold.

BRIEF DESCRIPTION OF THE DRAWINGS

For purpose of explanation, several embodiments of the disclosure are set forth in the following figures, which make the technical scheme and beneficial effect of the present disclosure is obvious.

DETAILED DESCRIPTION

Refer to the drawings, the same component symbol represents the same component. The principle of the present disclosure is illustrated in an appropriate computing environment. The following specification is based on some specific embodiments of the present disclosure as shown in the examples, which will not be considered to limit other specific embodiments not detailed herein.

The details will be described below.

Figure 1:
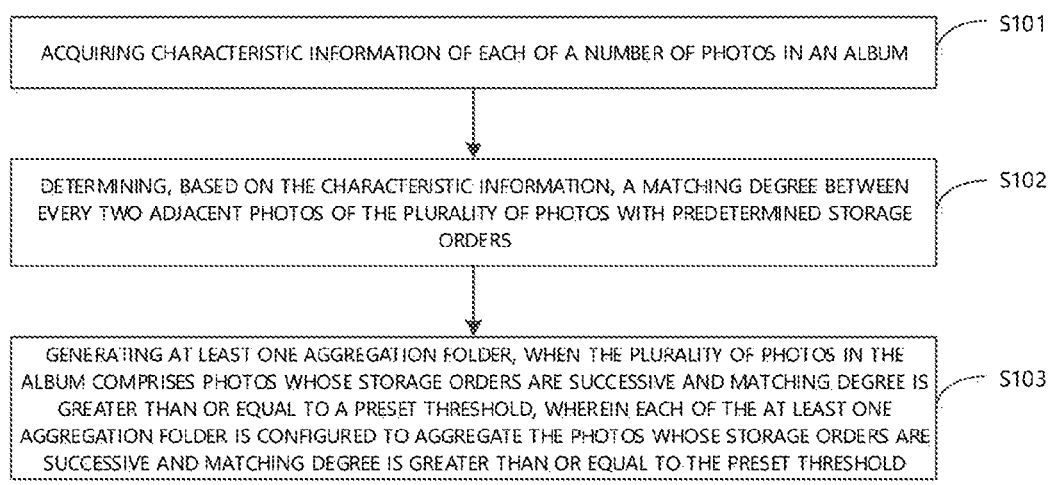
FIG. 1 illustrates a flow diagram of the photo processing method provided by the embodiment of the present disclosure.

Refer to FIG. 1, FIG. 1 illustrates a flow diagram of the photo processing method provided by the embodiment of the present disclosure, includes:

In block S101, acquiring characteristic information of each of a number of photos in an album.

The executive body of the embodiment of the present disclosure may be a terminal device such as a smartphone or a tablet computer.

Many portable devices, such as smartphones, are provided with photo capture functionality. The portable device album often stores a large quantity of photos. Users will spend much time on seeking a specific photo by scanning the photos one by one, leading to a low efficient in finding photos.

In the embodiment of the present disclosure, the terminal can first obtain characteristic information of each of a number of photos in an album.

For example, in one embodiment, the terminal can calculate hash values of each of the photos in the album by a perceptual hash algorithm, and the hash values of each of the photos is determined as the characteristic information thereof.

It should be noted that the perceptual hash algorithm (Perceptual Hash Algorithm) is one specific of hash algorithms, mainly used for searching for similar photos. By using the perceptual hash algorithm to calculate and process the photo, hash values may be obtained. The hash value is a 64-bit integer, can be used to characterize the photo's characteristic information.

For example, after obtaining the hash values for two photos, the terminal may compare the two hash values to determine how many bits are the same between the two 64-bit integers. For example, if the same bit of the two hash values reaches 55 bits, it is determined that the two photos are similar. Otherwise, the two photos are not similar photos.

In block S102, determining, based on the characteristic information, a matching degree between every two adjacent photos of the plurality of photos with predetermined storage orders.

For example, after calculating the hash value of each photo in the album and determining the hash value as the characteristic information for the corresponding photo, the terminal may compare a matching degree between every two adjacent photos, and the number of photos are arranged in a predetermined storage order.

In one embodiment, the number of photos is arranged according to shooting time order.

For example, photos in the album are arranged in a last-to-first order, i.e. the first photo in the album is the closest photo to the current time, and the last photo is taken earlier than any other photo in the album. The terminal can start the determining from the first and second photos in the album to determine the similarity of every two adjacent photos. When a matching degree between two adjacent photos is more than or equal to a preset threshold, the two adjacent photos are deemed to be similar. When a matching degree between two adjacent photos is less than the preset threshold, the two adjacent photos are deemed to be different.

In block S103, generating at least one aggregation folder, when the plurality of photos in the album comprises photos whose storage orders are successive and matching degree is greater than or equal to a preset threshold, wherein each of the at least one aggregation folder is configured to aggregate the photos whose storage orders are successive and matching degree is greater than or equal to the preset threshold.

For example, during the determining process of every two adjacent photos, at least one couple of the adjacent photos may have a matching degree greater than or equal to the preset threshold. That is, a similar photo to the adjacent photo of itself is determined, at least one aggregation folder may be generated. The aggregation folder is configured to aggregate the photos whose storage orders are successive and matching degree is greater than or equal to the preset threshold. That is, the photos aggregated in each aggregation folder are similar photos that have successive storage order in the album.

For example, in one embodiment, when the terminal determines a matching degree between every two adjacent photos of the plurality of photos with predetermined storage orders, the terminal may determine, according to storage orders, whether to mark every two adjacent photos with the same identity or not. Each of the plurality of photos is allowed to mark just once, and the photos is corresponding to the same identity have successive storage orders. That is, a second mark cannot be made after the photo has been marked once. The terminal marks the two adjacent photos with the same identity if the two adjacent photos have successive storage orders and a matching degree greater than or equal to the preset threshold. The terminal marks the two adjacent photos with different identities if the two adjacent photos have successive storage orders and a matching degree less than the preset threshold.

For example, there are ten photos arranged in an album. The ten photos are followed by Photo A to Photo J which are arranged in an order of last-first shooting time. When determining the matching degree of every two adjacent photos, the matching degree of the Photo A and the Photo B is not less than the preset threshold, the matching degree of the Photo B and the photo C is less than the preset threshold, the matching degree of the Photo C and the Photo D are not less than the preset threshold, the matching degree of the photo D and the Photo E is not less than the preset threshold, the matching degree of the Photo E and the Photo F are less than the preset threshold, the matching degree of the Photo F and Photo G is less than the preset threshold, the matching degree of the Photo G and the Photo H is less than the preset threshold, the matching degree of the photo H and the photo I is not less than the preset threshold, and the matching degree of the photo I and the photo J is not less than the preset threshold.

Figure 2:
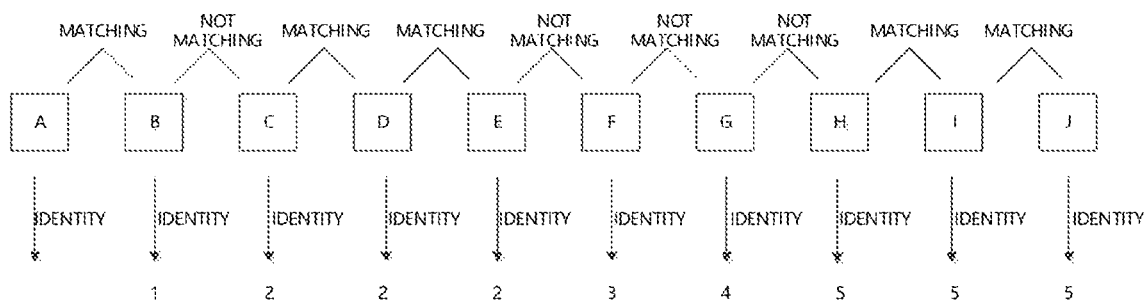
FIG. 2 illustrates each photo marked by the photo processing method provided by the embodiment of the present disclosure.

Referring to FIG. 2, the photos in the album are marked by the identity started from the Photo A and the Photo B according to the predetermined storage orders. For example, because the similarity of the Photo A and Photo B is not less than the preset threshold, the Photo A and Photo B may be marked with the same identity, such as marked as number "1".

Because the matching degree of the Photo B and the photo C is less than the preset threshold, the Photo B and the photo C may be marked by a different identity. For the Photo B is marked by number "1" before, the Photo C may be marked with number "2".

For the matching degree of the Photo C and the Photo D is not less than the preset threshold, the Photo D may be marked the same as the photo C, that is number "2". Similarly, the photo E is marked with the number "2".

For the matching degree of the Photo E and the Photo F is less than the preset threshold, the Photo F and the photo E may be marked with a different identity, such as marking the photo F by a number "3". Similarly, the photo G may be marked with a number "4". the photo H may be marked with a number "5".

For the matching degree of the photo H and the Photo I is not less than the preset threshold, the Photo I may be marked with the number "5". Similarly, the photo J may be marked with the number "5".

In all, three aggregation folders are generated, and each aggregation folder contains the photos with the same identity. For example, a first aggregation folder contains Photo A and Photo B for the two are adjacent photos and marked with the same identity, such as, the number "1". The second aggregation folder contains the photo C, the Photo D and the Photo E with number "2". The third aggregation folder contains the photo C, the Photo D and the Photo E with number "5"

The photo processing method generates an aggregation folder to store the similar photos, improving the simplicity of the album, and the efficiency of finding photos.

Figure 3:
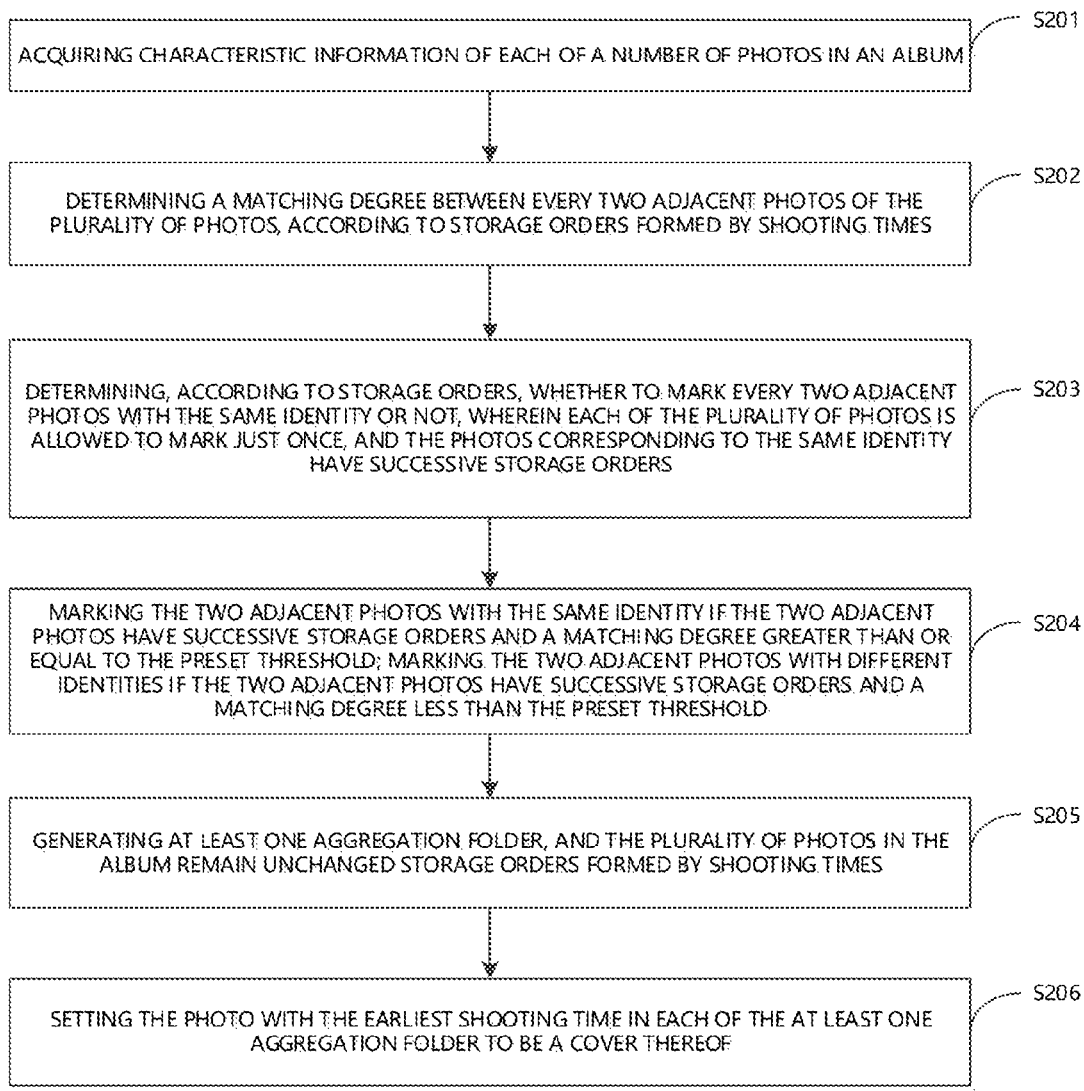
FIG. 3 illustrates another flow diagram of the photo processing method provided by the embodiment of the present disclosure.

Referred to FIG. 3, FIG. 3 provides another flow diagram of the photo processing method provided for the embodiment of the present disclosure, the process may include:

In block S201, acquiring characteristic information of each of a number of photos in an album.

In the embodiment of the present disclosure, the terminal may first obtain characteristic information of each of a number of photos in an album.

For example, in one embodiment, the terminal can acquire hash values of each of the plurality of photos in the album by a perceptual hash algorithm and determine the hash values of each of the plurality of photos as the characteristic information thereof.

It should be noted that the perceptual hash algorithm is one specific hash algorithms, mainly used for searching for similar photos. By using the perceptual hash algorithm to calculate and process the photo, hash values may be obtained. The hash value is a 64-bit integer, can be used to characterize the photo's characteristic information.

For example, after obtaining the hash values for two photos, the terminal may compare the two hash values to determine how many bits are the same between the two 64-bit integers. For example, if the same bit of the two hash values reaches 55 bits, it is determined that the two photos are similar. Otherwise, the two photos are not similar photos.

In block S202, determining a matching degree between every two adjacent photos of the plurality of photos, according to storage orders formed by shooting times.

For example, after calculating the hash value of each photo in the album and determining the hash value as the characteristic information for the corresponding photo, the terminal may compare a matching degree between every two adjacent photos, and a number of photos are arranged in the shooting time order.

For example, the photos in the album are arranged in a last-to-first shooting time order, i.e. the first photo in the album is the closest photo to the current time, and the last photo is taken earlier than any other photo in the album. The terminal can start the determining from the first and second photos in the album to determining the matching degree of every two adjacent photos. When a matching degree between two adjacent photos is more than or equal to a t preset threshold, the two adjacent photos are deemed to be similar. When a matching degree between two adjacent photos is less than the preset threshold, the present adjacent photos are deemed to be different.

In block S203, determining, according to storage orders, whether to mark every two adjacent photos with the same identity or not, wherein each of the plurality of photos is allowed to mark just once, and the photos corresponding to the same identity have successive storage orders.

In block S204, marking the two adjacent photos with the same identity if the two adjacent photos have successive storage orders and a matching degree greater than or equal to the preset threshold; marking the two adjacent photos with different identities if the two adjacent photos have successive storage orders and a matching degree less than the preset threshold.

The block S203 and the block 204 may include:

When the similar photos in the album are determined, every two adjacent photos may be determined whether to be marked with the same identity or not according to sequence of the shooting time order. Each photo is marked only once, and the photos marked with the same identity are successive in storage order. That is, a second mark cannot be made after each photo has been marked once. If the two adjacent photos have successive storage orders and a matching degree greater than or equal to the preset threshold, the two adjacent photos are marked with the same identity. If the two adjacent photos have successive storage orders and a matching degree less than the preset threshold, the two adjacent photos are marked with different identities.

For example, there are ten photos arranged in an album. The ten photos are followed by Photo A to Photo J which are arranged in an order of last-first shooting time. When determining the matching degree of every two adjacent photos, the matching degree of the Photo A and the Photo B is not less than the preset threshold, the matching degree of the Photo B and the photo C is less than the preset threshold, the matching degree of the Photo C and the Photo D are not less than the preset threshold, the matching degree of the photo D and the Photo E is not less than the preset threshold, the matching degree of the Photo E and the Photo F are less than the preset threshold, the matching degree of the Photo F and Photo G is less than the preset threshold, the matching degree of the Photo G and the Photo H is less than the preset threshold, the matching degree of the photo H and the photo I is not less than the preset threshold, and the matching degree of the photo I and the photo J is not less than the preset threshold.

The photos in the album are marked by the identity started from the Photo A and the Photo B according to the predetermined storage orders. For example, because the similarity of the Photo A and Photo B is not less than the preset threshold, the Photo A and Photo B may be marked with the same identity, such as marked as number "1".

Because the matching degree of the Photo B and the photo C is less than the preset threshold, the Photo B and the photo C may be marked by a different identity. For the Photo B is marked by number "1" before, the Photo C may be marked with number "2".

For the matching degree of the Photo C and the Photo D is not less than the preset threshold, the Photo D may be marked the same as the photo C, that is number "2". Similarly, the photo E is marked with the number "2".

For the matching degree of the Photo E and the Photo F is less than the preset threshold, the Photo F and the photo E may be marked with a different identity, such as marking the photo F by a number "3". Similarly, the photo G may be marked with a number "4". the photo H may be marked with a number "5".

In block S205, generating at least one aggregation folder, and the plurality of photos in the album remain unchanged storage orders formed by shooting times.

After all the photos in the album are marked, the photos with the same identity are aggregated and at least one folder is generated.

Three aggregation folders may be generated, and each aggregation folder contains the photos with the same identity. For example, a first aggregation folder contains Photo A and Photo B for the two are adjacent photos and marked with the same identity, such as, the number "1". The second aggregation folder contains the photo C, the Photo D and the Photo E with number "2". The third aggregation folder contains the photo C, the Photo D and the Photo E with number "5". The storing order of the photos in the at least one aggregation folder remains the same as the order of shooting time in the album.

In one embodiment, the Photo A to the Photo J in the album are originally arranged in order of last-first shooting time for example, the Photo A was taken later than the other photos and is arranged first in the album. The Photo B was taken earlier than the Photo A, but later than the photos other than the Photo A, arranged second in the album. The Photo J was taken earlier than the other photos and was arranged at the last of the album.

After the aggregation folder is generated, the order the Photo A to Photo J are still the same as the order of last-first shooting time in the album. That is, in the album, the first aggregation folder comes first, and the Photo A is arranged before the Photo B in the first aggregation folder. The second aggregation folder comes second, and the Photo C is arranged before the Photo D in the second aggregation folder. The Photo D is arranged before the Photo E. The Photo F comes third after the second aggregation folder, and the Photo G comes fourth after the Photo F. The third aggregation folder comes fifth. The Photo H comes first than the Photo I, and the Photo I comes first than the Photo J. That is, after a photo's aggregation, the photos in the album are still listed in the order as arranged the Photo A to Photo J as before.

In one embodiment, after the at least one aggregation folder is generated, the aggregation folder may be marked according to the identity information of the photos in the folder. For example, the first aggregation folder may be marked with the number "1", the second aggregation folder with the number "2", and the third folder by number "5".

The aggregation folders and the photos not belonging to neither of the aggregation folders in the album are ranked in the orders of the numbers from small to large. For example, the first aggregation folder (marked by the number "1") is in the first place, and the second aggregation folder (marked by the number "2") is in the second place, and the photo F(marked by number "3") is in the third place, and the photo G(marked by number "4") is in the fourth place, the third aggregation folder (marked by number "5") is in the fifth place.

In each aggregation folder, the photos may be arranged in the order of shooting time. For example, the photos C, the Photo D, and the Photo E are contained in the second folder, to be arranged in the order of shooting time, for example, in the order of last-first shooting time, the Photo C is in the first place, the Photo D is in the second place, and the Photo E is in the third place in the album. That is, before the aggregation, the photo C, the Photo D, and the Photo E are ranked in the order of last-first shooting time, and after the aggregation, the photo C, the Photo D, and the Photo E are still ranked in the order of last-first shooting time. By sorting above, all the photos in the album are arranged in the same order of as shooting time.

In block S206, setting the photo with the earliest shooting time in each of the at least one aggregation folder to be a cover thereof.

After the photos contained in each aggregating folder is arranged by shooting time, the first photo may be set as the cover of the aggregating folder for users to view.

For example, the first photo C may be taken as the cover of the second aggregating folder. This allows users to know that the second aggregating folder contains several photos like the cover.

It should be noted that in this embodiment, before the photos in the album aggregated, the photos are sorted according to the storage order based on the time of capture. For example, the ten photos in the album are arranged in the order of A, B, C, D, E, F, G, H, I, J. After the album is aggregated and arranged according to a predefined rules, the storage order in the album is the first aggregating folder (including Photo A and Photo B), the second aggregating folder(including photo C, D, E), photo F, photo G, and the third aggregating folder (including the photo H, I, J). As a result, the relative position of the photos in the album on the timeline does not change. The Photo B is still arranged in a rank before the Photo C, while the Photo G still ahead of the Photo H.

The photo processing method arranges the similar adjacent photos, and the order of the photos remains the same as the order of the shooting time in the original album. On the one hand, the simplicity of the album is improved, the photos searching efficiency is also improved, on the other hand, the photos remain the same location in the timeline as before, avoiding breaking the album's timeline. At the same time, because the aggregated photos are similar, it is easy for users to find similar photos captured at mostly the same time.

In one embodiment, the photo processing method provided by the embodiment of the present disclosure may also include the following steps:

When there is no photo contained in the folder, the folder may be deleted.

Take the second aggregating folder as an example. The second aggregating folder contains the Photo C, Photo D, and the Photo E. When users delete the photo C, the photo D, and the photo E during use, the number of the photos in the second aggregating folder is changed from three to zero, then the second aggregating folder becomes an empty folder. In this case, the second aggregating folder may be deleted.

The simplicity of the album may be improved by deleting the empty folder.

Refer to FIGS. 4-11, FIGS. 4 to 11 illustrates applying scenes the photo processing method provided by embodiment of the present disclosure.

Figure 4:
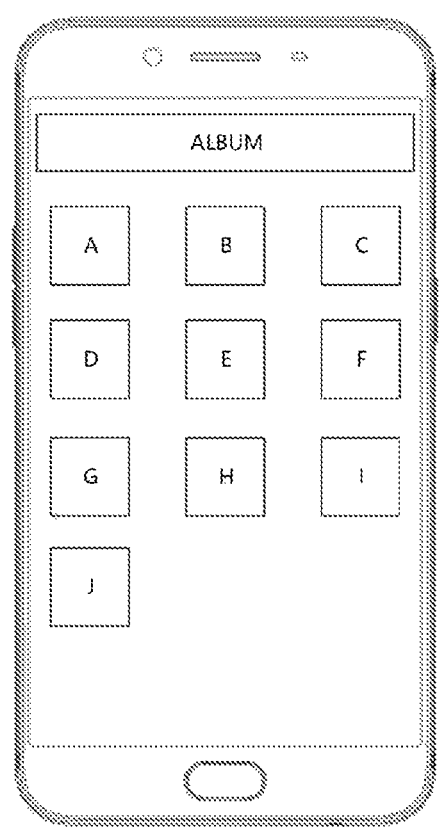
FIG. 4 to FIG. 11 illustrates applying scenes the photo processing method provided by embodiment of the present disclosure.

For example, there are ten photos arranged in an album. The ten photos are followed by Photo A to Photo J, which are arranged in an order of last-first shooting time. The Photo A is captured later than other photos, and the photo J is captured earlier than other photos. The interface of the album is shown in FIG. 4.

The characteristic information of the Photo A to the photo J may be obtained first, and then the matching degree between every two adjacent photos is compared according to the characteristic information. The order of the comparison is according to the last-first shooting time, starting from the Photo A and the Photo B.

During determining the matching degree of every two adjacent photos, the matching degree of the Photo A and the Photo B is not less than the preset threshold, the matching degree of the Photo B and the photo C is less than the preset threshold, the matching degree of the Photo C and the Photo D are not less than the preset threshold, the matching degree of the photo D and the Photo E is not less than the preset threshold, the matching degree of the Photo E and the Photo F are less than the preset threshold, the matching degree of the Photo F and Photo G is less than the preset threshold, the matching degree of the Photo G and the Photo H is less than the preset threshold, the matching degree of the photo H and the photo I is not less than the preset threshold, and the matching degree of the photo I and the photo J is not less than the preset threshold.

After that, every two adjacent photos may be determined whether to be marked with the same identity or not according to sequence of the predefined order, starting from the Photo A and the Photo B. Each photo can be marked just once, and the photo corresponding to the same identity is continuously arranged in order. That is, a second mark cannot be made after each photo has been marked once. If the storage order is adjacent and the matching degree is greater than or equal to the preset threshold, the terminal can mark the corresponding two photos with the same identity. If the storage order is adjacent and the matching degree is less than the preset threshold, the terminal can mark the corresponding two photos with different identity.

For the matching degree of the Photo A and Photo B is not less than the preset threshold, the Photo A and Photo B may be marked with the same identity or not information, such as marked as number "1".

For the matching degree of the Photo B and the photo C is less than the preset threshold, the Photo B and the photo C may be marked by a different identity. For the Photo B is marked by number "1" before, the Photo C may be marked with number "2".

For the matching degree of the Photo C and the Photo D is not less than the preset threshold, the Photo D may be marked the same as the photo C, that is number "2". Similarly, the photo E is marked with the number "2".

For the matching degree of the Photo E and the Photo F is less than the preset threshold, the Photo F and the photo E may be marked with a different identity, such as marking the photo F by a number "3". Similarly, the photo G may be marked with a number "4". The photo H may be marked with a number "5".

Three aggregating folders may be generated, and each aggregating folder contains the photos with the same identity. For example, a first aggregating folder contains Photo A and Photo B for the two are adjacent photos and marked with the same identity, such as, the number "1". The second aggregating folder contains the photo C, the Photo D and the Photo E with number "2". The third aggregating folder contains the photo C, the Photo D and the Photo E with number "5".

In each aggregating folder, the photos are still arranged in order of last-first shooting time. For example, the Photo A was taken later than the other photos and is arranged first in the album. The Photo B was taken earlier than the Photo A, but later than the photos other than the Photo A, arranged second in the album. In the second aggregating folder, the Photo C is arranged before the Photo D. The Photo D is arranged before the Photo E. In the third aggregating folder, the Photo H comes first than the Photo I, and the Photo I comes first than the Photo J.

In one embodiment, after the at least one aggregating folder is generated, the aggregating folder may be marked according to the identity information of the photos in the folder. For example, the first aggregating folder may be marked with the number "1", the second aggregating folder with the number "2", and the third aggregating folder by number "5".

Figure 5:
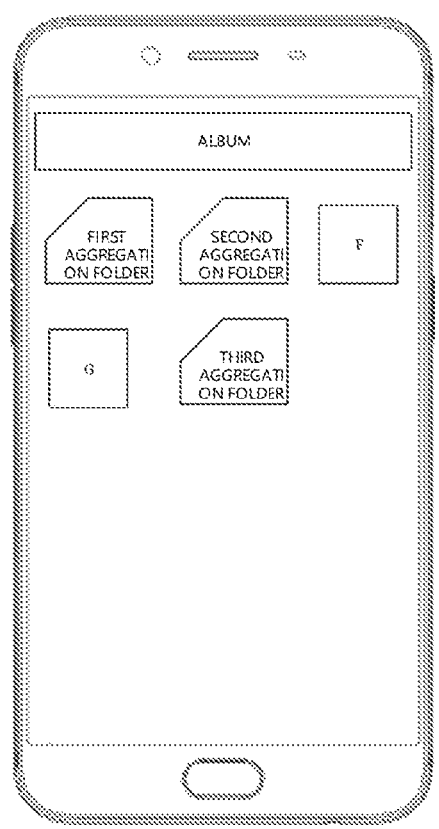

The aggregating folders and the photos not belonging to neither of the folders in the album are ranked in the orders of the numbers from small to large. For example, the first aggregating folder (marked by the number "1") is in the first place, and the second aggregating folder (marked by the number "2") is in the second place, and the photo F (marked by number "3") is in the third place, and the photo G (marked by number "4") is in the fourth place. The third aggregating folder (marked by number "5") is in the fifth place. The interface of the album is illustrated in FIG. 5. Compared with the FIG. 4, the interface shown in FIG. 5 looks more concise.

Figure 6:
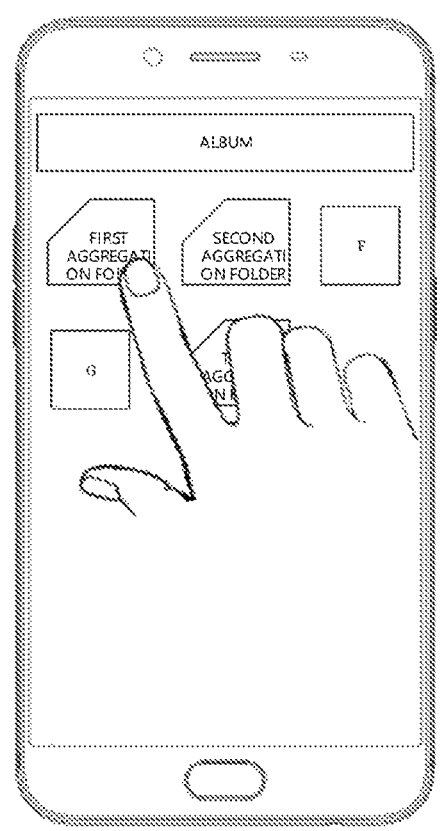
Figure 7:
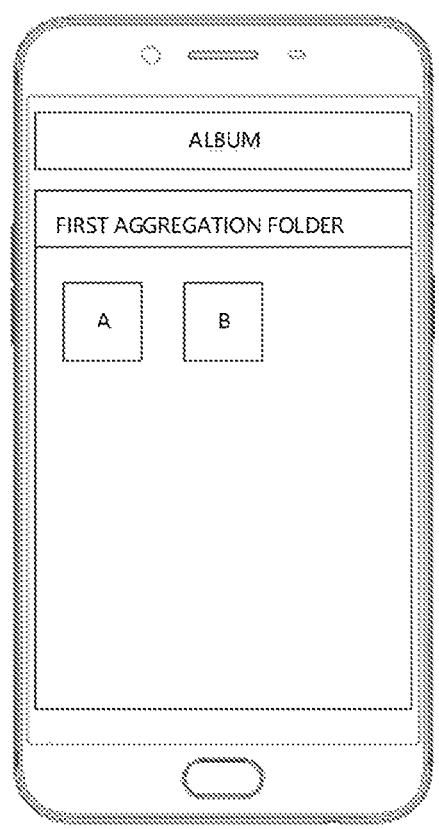

The user clicks on the first aggregating folder, as shown in FIG. 6, the Photo A and Photo B are displayed, as shown in the FIG. 7.

Figure 8:
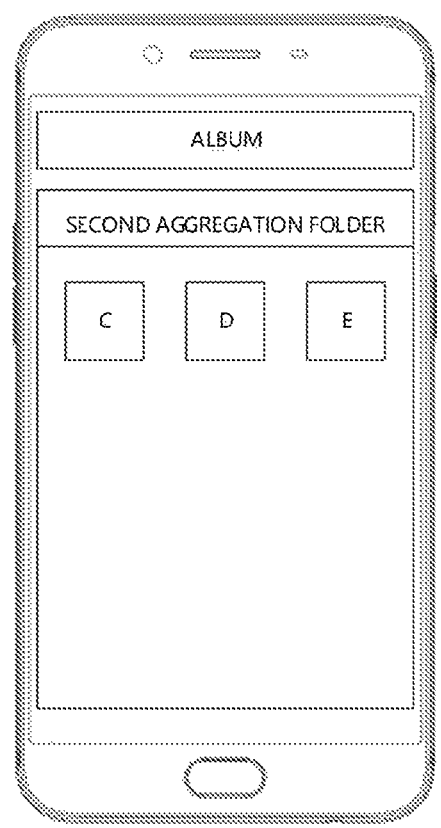
Figure 9:
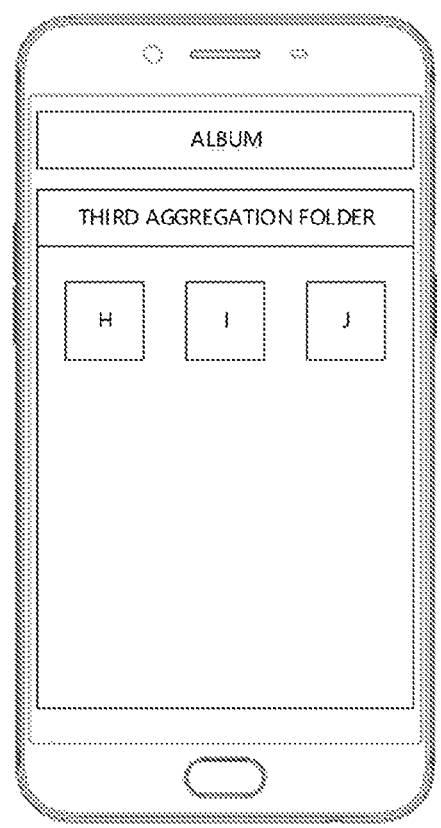

Similarly, when the user clicks on the second aggregating folder, the photo C, the photo D and the photo E are displayed, as shown in the FIG. 8. When the user clicks on the third aggregating folder, the photo H, the photo I, and the photo J will be displayed on the terminal interface, as shown in FIG. 9.

The photos remain the same location in the timeline as before, so that users can still find the photos in the album in order of shooting time, that is, the user's usage habits of finding photos can be retained. For example, before the aggregation, the Photo B is arranged before the Photo C, and the Photo B is still arranged before the Photo C after the aggregation.

Figure 10:
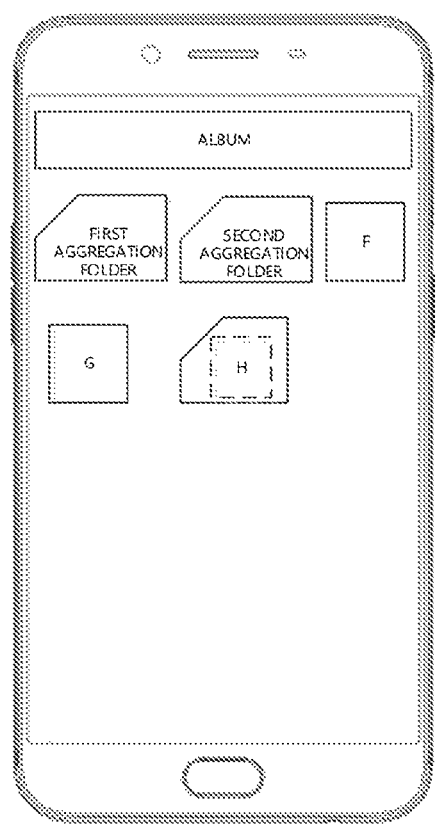

In one embodiment, for example, if the user deletes the photo I and the photo J in the third aggregating folder, then only the photo H is left in the third aggregating folder, as shown in FIG. 10. In this case, the Photo H may be taken from the third aggregating folder and arranged in the album in the order based on the time of capture. For example, the photo H can be arranged after the photo G, for the photo H was taken earlier than the Photo G.

Figure 11:
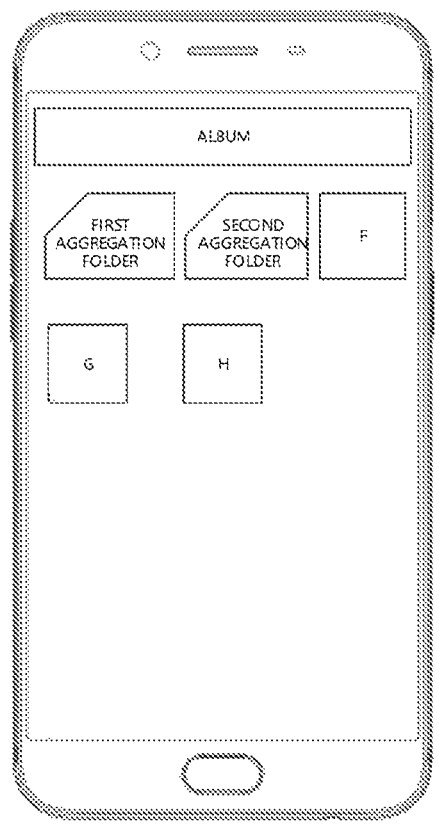

Then the third aggregating folder with no photos may be de deleted as shown in FIG. 11.

Figure 12:
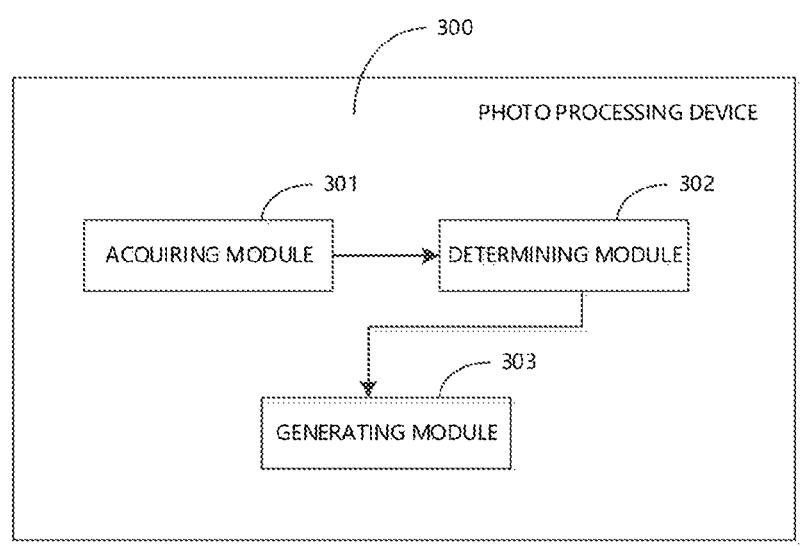
FIG. 12 illustrates a schematic structure of the photo processing device provided by the embodiment of the present disclosure.

Refer to FIG. 12, FIG. 12 illustrates a schematic structure of the photo processing device provided by the embodiment of the present disclosure. The photo processing device may include an acquiring module 301, a determining module 302 and a generating module 303.

The acquiring module 301 is configured to acquire characteristic information of each of a number of photos in an album.

Many portable devices, such as smartphones, are provided with photo capture functionality. The portable device album often stores a large quantity of photos. Users will spend much time on seeking a specific photo by scanning the photos one by one, leading to a low efficient in finding photos.

In the embodiment of the present disclosure, the terminal may first obtain characteristic information of each of a number of photos in an album.

For example, in one embodiment, the terminal can calculate hash values of each photo in the album by a perceptual hash algorithm, and the hash value of each photo is determined as the characteristic information of the corresponding photo.

The determining module 302 is configured to determine, based on the characteristic information, a matching degree between every two adjacent photos of the plurality of photos with predetermined storage orders.

For example, after calculating the hash value of each photo in the album and determining the hash value as the characteristic information for the corresponding photo, the terminal may compare a matching degree between every two adjacent photos, and a number of photos are arranged in a predetermined storage order.

In one embodiment, a number of photos are arranged according to shooting time order.

For example, photos in the album are arranged in a last-to-first order, i.e. the first photo in the album is the closest photo to the current time, and the last photo is taken earlier than any other photo in the album. The terminal can start the determining from the first and second photos in the album to determine every two adjacent photos. When a matching degree between two adjacent photos is more than or equal to a preset threshold, the two adjacent photos are deemed to be similar. When a matching degree between two adjacent photos is less than the preset threshold, the present adjacent photos are deemed to be different.

The generating module 303 is configured to generate at least one aggregation folder, when the plurality of photos in the album comprises photos whose storage orders are successive and matching degree is greater than or equal to a preset threshold, wherein each of the at least one aggregation folder is configured to aggregate the photos whose storage orders are successive and matching degree is greater than or equal to the preset threshold.

For example, during the determining process of every two adjacent photos, at least one couple of the adjacent photos may have a matching degree greater than or equal to the preset threshold. That is, a similar photo to the adjacent photo of itself is determined, at least one aggregation folder may be generated. The aggregation folder is configured to store every two adjacent photos arranged in the album and the matching degree between every two adjacent photos are greater than or equal to the preset threshold. That is, the similar photos aggregated in each aggregation folder are originally continuously arranged in the predetermined storage order in the album.

For example, in one embodiment, the generating module 303 is configured to:

determine, according to storage orders, whether to mark every two adjacent photos with the same identity or not, wherein each of the plurality of photos is allowed to mark just once, and the photos corresponding to the same identity have successive storage orders.

mark the two adjacent photos with the same identity if the two adjacent photos have successive storage orders and a matching degree greater than or equal to the preset threshold.

mark the two adjacent photos with different identities if the two adjacent photos have successive storage orders and a matching degree less than the preset threshold.

generate at least one aggregating folder to aggregate the photos with the same identity.

For example, in one embodiment, when the determining module 302 determines that there are similar photos in the album, every two adjacent photos may be determined by the determining module 302 whether to be marked with the same identity or not according to sequence of the predefined order. Each photo will be marked just once, and the photos marked with the same identity or not information are continuously arranged in order. That is, a second mark cannot be made after each photo has been marked once. If the photos are adjacent and the matching degree is greater than or equal to the preset threshold, the two adjacent photos may be marked with the same identity. If the adjacent photos have a matching degree less than the preset threshold, the two adjacent photos are marked with different identity by the determining module 302.

For example, there are ten photos arranged in an album. The ten photos are followed by Photo A to Photo J which are arranged in an order of last-first shooting time. When the determining module 302 determines the matching degree of every two adjacent photos, the matching degree of the Photo A and the Photo B is not less than the preset threshold, the matching degree of the Photo B and the photo C is less than the preset threshold, the matching degree of the Photo C and the Photo D are not less than the preset threshold, the matching degree of the photo D and the Photo E is not less than the preset threshold, the matching degree of the Photo E and the Photo F are less than the preset threshold, the matching degree of the Photo F and Photo G is less than the preset threshold, the matching degree of the Photo G and the Photo H is less than the preset threshold, the matching degree of the photo H and the photo I is not less than the preset threshold, and the matching degree of the photo I and the photo J is not less than the preset threshold.

Every two adjacent photos are determined by the determining module 302 whether to be marked with the same identity or not according to sequence of the predefined order starting from the Photo A and the Photo B. The adjacent photos with the matching degree greater than or equal to the preset threshold may be marked with the same identity, otherwise, the different identity. Each photo is only marked once, and the photos marked with the same identity or not have successive storage orders.

For example, because the similarity of the Photo A and Photo B is not less than the preset threshold, the Photo A and Photo B may be marked with the same identity or not information, such as marked as number "1" by the generating module 303.

Because the matching degree of the Photo B and the photo C is less than the preset threshold, the Photo B and the photo C may be marked by a different identity. For the Photo B is marked by number "1" before, the Photo C may be marked with number "2" by the generating module 303.

For the matching degree of the Photo C and the Photo D is not less than the preset threshold, the Photo D may be marked the same as the photo C, that is number "2" by the generating module 303. Similarly, the photo E is marked with the number "2" by the generating module 303.

For the matching degree of the Photo E and the Photo F is less than the preset threshold, the Photo F and the photo E may be marked with a different identity, such as marking the photo F by a number "3" by the generating module 303. Similarly, the photo G may be marked with a number "4". the photo H may be marked with a number "5" by the generating module 303.

In one embodiment, the Photo A to the Photo J in the album are originally arranged in order of last-first shooting time for example, the Photo A was taken later than the other photos and is arranged first in the album. The Photo B was taken earlier than the Photo A, but later than the photos other than the Photo A, arranged second in the album. The Photo J was taken earlier than the other photos and was arranged at the last of the album.

The generating module 303 generates three aggregating folders to aggregate similar photos. For example, a first aggregating folder contains Photo A and Photo B for the two are adjacent photos and marked with the same identity, such as, the number "1". The second aggregating folder contains the photo C, the Photo D and the Photo E with number "2". The third aggregating folder contains the photo C, the Photo D and the Photo E with number "5". The storing order of the photos in the at least one aggregating folder remains the same as the order of shooting time in the album.

In one embodiment, the generating module 303 is configured to:

Generating at least one aggregation folder, and the order of the photos in the folder remains the same as before.

For example, the generating module 303 makes the arrange order of the photos in the folder remains the same as before.

For example, the Photo A to the Photo J in the album are originally arranged in order of last-first shooting time, the Photo A was taken later than the other photos and is arranged first in the album. The Photo B was taken earlier than the Photo A, but later than the photos other than the Photo A, arranged second in the album. The Photo J was taken earlier than the other photos and was arranged at the last of the album.

After the aggregating folder is generated, the order the Photo A to Photo J are still the same as the order of last-first shooting time in the album. That is, in the album, the first aggregating folder comes first, and the Photo A is arranged before the Photo B in the first folder. The second aggregating folder comes second, and the Photo C is arranged before the Photo D in the second aggregating folder. The Photo D is arranged before the Photo E. The Photo F comes third after the second folder, and the Photo G comes fourth after the Photo F. The third aggregating folder comes fifth. The Photo H comes first than the Photo I, and the Photo I comes first than the Photo J. That is, after a photo's aggregation, the photos in the album are still listed in the order as arranged the Photo A to Photo J as before.

In one embodiment, the determining module 302 is configured to determine the adjacent photos according to the shooting time order. The generating module 303 is configured to generate a folder to contain the similar photos, and the arrange order remains the same as before.

For example, after the at least one aggregating folder is generated by the generating module 303, the aggregating folder may be marked according to the identity information of the photos in the aggregating folder. For example, the first aggregating folder may be marked with the number "1" by the generating module 303, the second aggregating folder with the number "2", and the third aggregating folder by number "5".

The aggregating folders and the photos not belonging to neither of the folders in the album are ranked in the orders of the numbers from small to large by the generating module 303. For example, the first aggregating folder (marked by the number "1") is in the first place by the generating module 303, and the second aggregating folder (marked by the number "2") is in the second place, and the photo F(marked by number "3") is in the third place, and the photo G(marked by number "4") is in the fourth place, The third aggregating folder (marked by number "5") is in the fifth place.

In each aggregating folder, the generating module 303 is configured to arrange the photos in the order of shooting time. For example, the photos C, the Photo D, and the Photo E are contained in the second aggregating folder, to be arranged in the order of shooting time by the generating module 303, for example, in the order of last-first shooting time, the Photo C is in the first place, the Photo D is in the second place, and the Photo E is in the third place in the album. That is, before the aggregation, the photo C, the Photo D, and the Photo E are ranked in the order of last-first shooting time, and after the aggregation, the photo C, the Photo D, and the Photo E are still ranked in the order of last-first shooting time.

By sorting above, all the photos in the album are arranged in the same order of shooting time.

Figure 13:
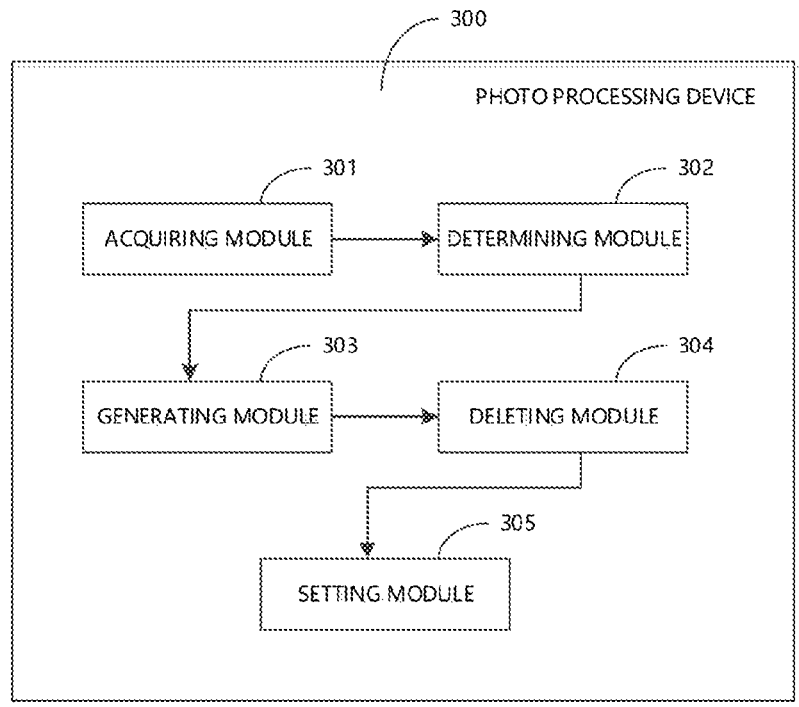
FIG. 13 illustrates another schematic structure of the photo processing device provided by the embodiment of the present disclosure.

Refer to FIG. 13, FIG. 13 illustrates another schematic structure of the photo processing device provided by the embodiment of the present disclosure. The photo processing device 300 may include a deleting module 304 and a setting module 305.

The deleting module 304 is configured to delete the folder when there is no photo contained in the aggregating folder.

Take the second aggregating folder as an example. The second aggregating folder contains the Photo C, Photo D, and the Photo E. When users delete the photo C, the photo D, and the photo E during use, the number of the photos in the second aggregating folder is changed from three to zero, then the second aggregating folder becomes an empty folder. In this case, the second aggregating folder may be deleted by the deleting module 304.

The simplicity of the album may be improved by deleting the empty folder.

The setting module 305 is configured to set the first photo in each aggregating folder to be the cover of the aggregating folder.

For example, the first photo C may be taken as the cover of the second aggregating folder. This allows users to know that the second aggregating folder contains several photos like the cover.

The embodiment of the present disclosure also provide a computer equipment, which may include memory, processor, as well as a computer program stored in the memory and can be run in the processor, the processor can implement the computer program provided by the embodiment of the present disclosure in the photo processing method of the steps.

For example, the computer equipment can be a mobile terminal such as a tablet computer, a smartphone, and so on.

Figure 14:
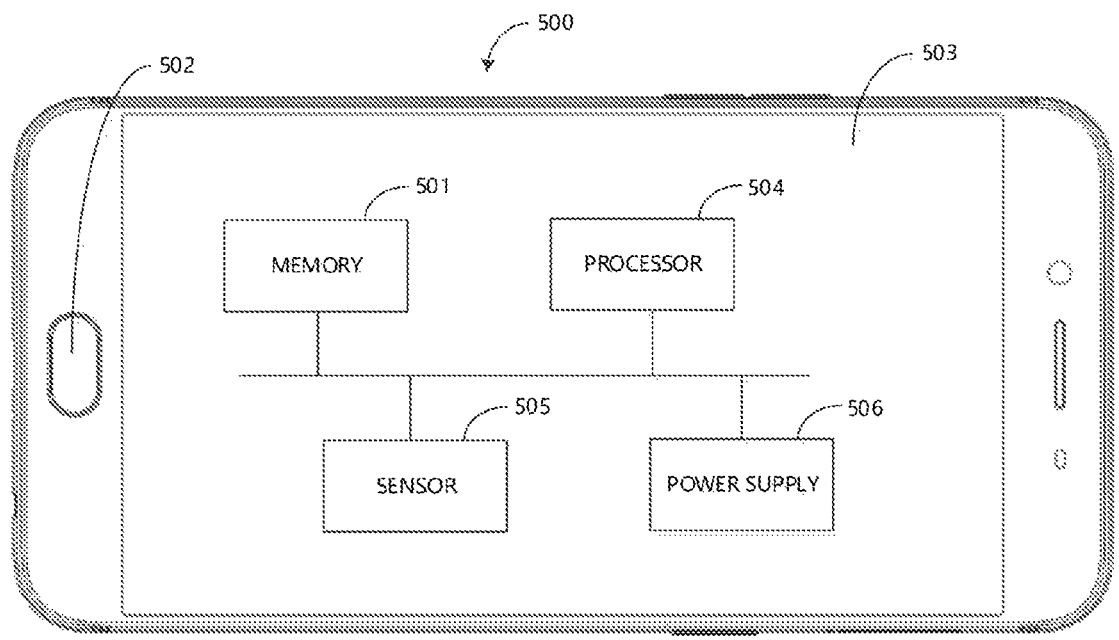
FIG. 14 illustrates a schematic structure of a portable device provided by the embodiment of the present disclosure.

FIG. 14 illustrates a schematic structure of a portable device provided by the embodiment of the present disclosure. The mobile terminal 500 may include: a memory with one or more computer-readable storage memory 501, an input unit 502, a display unit 503, a processor 504 with one or more processing cores, a sensor 505 and components such as a power supply 506. It is understood by the technical personnel in the art that the structure of the mobile terminal shown in FIG. 14 does not constitute a limit to the mobile terminal.

The memory 501 can be used to store applications and data. The application stored in the memory 501 contains executable code. Applications can be used to form a variety of functional modules. The processor 504 performs a variety of functional applications as well as data processing by running applications stored in the memory 501.

The input unit 502 can be used to receive input of numeric, character, or user characteristics information (such as fingerprints) and to generate keyboard, mouse, lever, optical, or trackball signal inputs related to user settings and functional controls.

The display unit 503 can be used to display information entered by the user or messages provided to the user, as well as various graphical user interfaces for mobile terminals, which can consist of graphics, text, icons, videos, and any combination of them. The display unit 503 may include a display panel.

The processor 504 is the control center for mobile terminals, connecting entire parts of the mobile terminal using a variety of interfaces and lines, and storing it in the memory 501 by running or executing within the application, and to call the data form various functions of the mobile terminal and process the data to overall monitoring the mobile terminal.

Mobile terminals can also include at least one sensor 505, such as optical sensors, gyroscopes sensors and other sensors.

The mobile terminal can also include a power supply 506 (e.g. batteries, etc.) that supplies power to individual components.

Although not shown in FIG. 14, the mobile terminals may also include cameras, Bluetooth modules, etc., which are not repeated here.

In this embodiment, the processor 504 in the mobile terminal loads the computer program corresponding to the process of one or more applications into the memory 501, as follows instructions below, and is run by the processor 504 in the memory 501 to:

acquire characteristic information of each of a plurality of photos in an album.

determine, based on the characteristic information, a matching degree between every two adjacent photos of the plurality of photos with predetermined storage orders;

generate at least one aggregation folder, when the plurality of photos in the album comprises photos whose storage orders are successive and matching degree is greater than or equal to a preset threshold, wherein each of the at least one aggregation folder is configured to aggregate the photos whose storage orders are successive and matching degree is greater than or equal to the preset threshold.

When the processor 504 executes the operation of generating at least one aggregation folder, when the plurality of photos in the album comprises photos whose storage orders are successive and matching degree is greater than or equal to a preset threshold, the steps as follow are implemented: determining, according to storage orders, whether to mark every two adjacent photos with the same identity or not, wherein each of the plurality of photos is allowed to mark just once, and the photos corresponding to the same identity have successive storage orders; marking the two adjacent photos with the same identity if the two adjacent photos have successive storage orders and a matching degree greater than or equal to the preset threshold; marking the two adjacent photos with different identities if the two adjacent photos have successive storage orders and a matching degree less than the preset threshold; and generating at least one aggregating folder to aggregate the photos with the same identity.

When the processor 504 executes the operation of determining a matching degree between every two adjacent photos of the plurality of photos with predetermined storage orders, the steps as follow are implemented: determining a matching degree between every two adjacent photos according to the characteristic information, wherein a number of photos are arranged in a shooting time order. When the processor 504 performs the step of generating at least one aggregation folder and the order of the photos in the photo remains unchanged, can perform the steps: generating at least one aggregation folder and the order of the photos in the photo remains the same as the photo capturing order.

The processor 504 can implement the following steps: deleting the aggregation folder when there is no photo in it.

Processor 504 can implement the following steps: setting the photo with the earliest shooting time in each of the at least one aggregation folder to be a cover thereof.

In one embodiment, the processor 504 can implement the following step: acquiring hash values of each of a number of photos by a perceptual hash algorithm and determine the hash value as the characteristic information of each photo when acquiring the characteristic information of the photos.

In the above embodiments, the description of each embodiment has its own emphasis, in an embodiment does not detail the part, which can be seen the above for the photo processing method of a detailed description, not repeated here.

The photo processing device provided in the embodiment of the present disclosure is the same idea as the photo processing method in the embodiment above and is stated in the photo processing device on which the "photo processing method" can be run. Any of the methods provided in the embodiment, the specific implementation process is detailed in the embodiments of the photo processing method of, not repeated here.

It should be noted that, for the case of the present disclosure, the photo processing method, the ordinary personal in this field can understand the implementation of the embodiment of the present disclosure of the photo processing method of all or part of the process, is through the computer program to control the relevant hardware to complete, the computer program can be stored in computer read memory, such as stored in the memory, and is executed by at least one processor, and the execution process may include the process of implementing the photo processing method as described. Among them, the memory may be a disk, optical disc, read only memory (ROM, Read Only Memory), random access memory (RAM, Random Access Memory) and so on.

For the photo processing device of the embodiment of the present disclosure, each function module may be integrated into a processing chip, or it may be a separate physical presence of each module, or two or more modules can be integrated into one module. The above integrated module can be implemented in the form of hardware, or in the form of software functional module. If the integrated module is implemented in the form of a software function module and sold or used as a separate product, it may also be stored in a computer readable memory, such as the memory for read-on memory, disk or optical disc.

The above embodiment of the present disclosure provides photo processing method, device and computer equipment provided in detail, the application of specific, the principle and embodiment of the present disclosure are described above, the above embodiments are only used to help understand the method and its core ideas. The contents of this specification shall not be construed as a limitation on the present disclosure.

What is claimed is:

1. A photo processing method, comprising:
acquiring characteristic information of each of a plurality of photos in an album;
determining, based on the characteristic information, a matching degree between every two adjacent photos of the plurality of photos with predetermined storage orders; and
generating at least one aggregation folder in the album, when the plurality of photos in the album comprises photos whose storage orders are successive and matching degree is greater than or equal to a preset threshold, wherein each of the at least one aggregation folder is configured to aggregate the photos whose storage orders are successive and matching degree is greater than or equal to the preset threshold;
wherein generating the at least one aggregation folder comprises:
generating the at least one aggregation folder, where the storage orders of the plurality of photos in the album remain unchanged.

2. The photo processing method of claim 1, wherein generating at least one aggregation folder, when the plurality of photos in the album comprises photos whose storage orders are successive and matching degree is greater than or equal to a preset threshold, comprises:
determining, according to storage orders, whether to mark every two adjacent photos with the same identity or not, wherein each of the plurality of photos is allowed to mark just once, and the photos corresponding to the same identity have successive storage orders;

marking the two adjacent photos with the same identity if the two adjacent photos have successive storage orders and a matching degree greater than or equal to the preset threshold;

marking the two adjacent photos with different identities if the two adjacent photos have successive storage orders and a matching degree less than the preset threshold; and generating at least one aggregating folder to aggregate the photos with the same identity.

3. The photo processing method of claim 2, wherein determining a matching degree between every two adjacent photos of the plurality of photos with predetermined storage orders, comprises:

determining a matching degree between every two adjacent photos of the plurality of photos, according to storage orders formed by shooting times;

wherein generating at least one aggregation folder, and the plurality of photos in the album remain unchanged storage orders, comprises:

generating at least one aggregation folder, and the plurality of photos in the album remain unchanged storage orders formed by shooting times.

4. The photo processing method of claim 1, wherein the method further comprises: deleting the aggregation folder when there is no photo in the aggregation folder.

5. The photo processing method of claim 1, wherein the method further comprises:

setting the photo with the earliest shooting time in each of the at least one aggregation folder to be a cover thereof.

6. The photo processing method of claim 1, wherein acquiring characteristic information of each of a plurality of photos in an album, comprises:

acquiring hash values of each of the plurality of photos in the album by a perceptual hash algorithm and determining the hash values of each of the plurality of photos as the characteristic information thereof.

7. A photo processing device, comprising:

an acquiring module configured to acquire characteristic information of each of a plurality of photos in an album;

a determining module configured to determine, based on the characteristic information, a matching degree between every two adjacent photos of the plurality of photos with predetermined storage orders; and a generating module configured to generate at least one aggregation folder in the album, when the plurality of photos in the album comprises photos whose storage orders are successive and matching degree is greater than or equal to a preset threshold, by:

determining, according to storage orders, whether to mark every two adjacent photos with the same identity or not, wherein each of the plurality of photos is allowed to mark just once, and the photos corresponding to the same identity have successive storage orders;

marking the two adjacent photos with the same identity if the two adjacent photos have successive storage orders and a matching degree greater than or equal to the preset threshold;

marking the two adjacent photos with different identities if the two adjacent photos have successive storage orders and a matching degree less than the preset threshold; and generating at least one aggregating aggregation folder to aggregate the photos with the same identity;

wherein each of the at least one aggregation folder is configured to aggregate the photos whose storage orders are successive and matching degree is greater than or equal to the preset threshold;

wherein the generating module is configured to generate the at least one aggregation folder, and where the storage orders of the plurality of photos in the album remain unchanged.

8. The photo processing device of claim 7, wherein the determining module is configured to determine a matching degree between every two adjacent photos of the plurality of photos, according to storage orders formed by shooting times; and the generating module is configured to generate at least one aggregation folder, and the plurality of photos in the album remain unchanged storage orders formed by shooting times.

9. The photo processing device of claim 7, wherein the device further comprises a deleting module configured to delete the aggregation folder when there is no photo in the aggregation folder.

10. The photo processing device of claim 7, wherein the device further comprise a setting module configured to set the photo with the earliest shooting time in each of the at least one aggregation folder to be a cover thereof.

11. The photo processing device of claim 7, wherein the acquiring module is configured to acquire hash values of each of the plurality of photos in the album by a perceptual hash algorithm and determining the hash values of each of the plurality of photos as the characteristic information thereof.

12. A computer equipment, comprising a memory, a processor, and a computer program stored in the memory and executable by the processor, when executing the computer program the processor implementing the steps of:

acquiring characteristic information of each of a plurality of photos in an album;

determining, based on the characteristic information, a matching degree between every two adjacent photos of the plurality of photos with predetermined storage orders; and generating at least one aggregation folder in the album, when the plurality of photos in the album comprises photos whose storage orders are successive and matching degree is greater than or equal to a preset threshold, comprising:

marking the first photo in the album with a number identity;

determining, according to the predetermined storage orders, whether to mark every two adjacent photos with the same number identity or not, wherein each of the plurality of photos is allowed to mark just once, and the photos corresponding to the same number identity have successive storage orders;

with the n-th photo being marked with a number identity i, marking the (n+1)-th photo with the number identity i when the n-th photo and the (n+1)-th photo have a matching degree greater than or equal to the preset threshold, and marking the (n+1)-th photo with a number identity i+1 when the n-th photo and the (n+1)-th photo have a matching degree less than the preset threshold;

generating at least one aggregating folder to aggregate the photos with the same number identity, and mark each of the aggregating folder with the number identity of the photos aggregated therein, wherein each of the at least one aggregation folder is configured to aggregate the photos whose storage orders are successive and matching degree is greater than or equal to the preset threshold; and ranking the at least one aggregating folder and non-aggregated photos in orders of the number identities from small to large;

wherein in generating the at least one aggregation folder, the storage orders of the plurality of photos in the album remain unchanged.

13. The computer equipment of claim 12, wherein the processor executes the operation of determining a matching degree between every two adjacent photos of the plurality of photos with predetermined storage orders, the steps as follow are implemented:

determining a matching degree between every two adjacent photos of the plurality of photos, according to storage orders formed by shooting times;

wherein the processor executes the computer program for generating at least one aggregation folder, and the plurality of photos in the album remain unchanged storage orders, comprises:

generating at least one aggregation folder, and the plurality of photos in the album remain unchanged storage orders formed by shooting times.

14. The computer equipment of claim 12, wherein the processor executes the computer program to delete the aggregation folder when there is no photo in the aggregation folder.

15. The computer equipment of claim 12, wherein the processor executes the computer program to set the photo with the earliest shooting time in each of the at least one aggregation folder to be a cover thereof.

16. The photo processing method of claim 6, wherein each of the hash values is a 64-bit integer, and determining, based on the characteristic information, a matching degree between every two adjacent photos of the plurality of photos with predetermined storage orders, comprising: determining how many bits are the same between the hash values of every two adjacent photos.

17. The computer equipment of claim 12, wherein the processor executes the computer program to acquire hash values of each of the plurality of photos in the album by a perceptual hash algorithm and determining the hash values of each of the plurality of photos as the characteristic information thereof.

* * * * *